United States Patent [19]

Moen

[11] Patent Number: 4,730,640

[45] Date of Patent: Mar. 15, 1988

[54] HANDLE CONSTRUCTION FOR MIXING VALVE

[75] Inventor: Alfred M. Moen, Destin, Fla.

[73] Assignee: Stanadyne, Inc., Windsor, Conn.

[21] Appl. No.: 944,009

[22] Filed: Dec. 22, 1986

[51] Int. Cl.$^4$ ............................................. F16K 11/02
[52] U.S. Cl. ............................. 137/625.17; 251/284
[58] Field of Search ................. 137/625.17, 636.4; 251/284, 287, 288; 403/355, 356

[56] References Cited

U.S. PATENT DOCUMENTS

| | | | |
|---|---|---|---|
| 913,100 | 2/1909 | Burg | 403/356 X |
| 2,611,278 | 9/1952 | Turnbull | 403/356 X |
| 2,950,933 | 8/1960 | Mayne et al. | 403/356 X |
| 3,592,229 | 7/1971 | Moen | 137/625.17 |
| 3,726,316 | 4/1973 | Moen | 137/625.17 |
| 4,050,475 | 9/1977 | Watts | 137/625.17 |
| 4,103,709 | 8/1978 | Fischer | 137/625.17 X |
| 4,580,601 | 4/1986 | Schlotman et al. | 137/625.17 |

Primary Examiner—Alan Cohan
Assistant Examiner—John Rivell
Attorney, Agent, or Firm—Kinzer, Plyer, Dorn, McEachran & Jambor

[57] ABSTRACT

A hot and cold water mixing valve includes a sleeve formed and adapted to fit within a valve fixture such as a kitchen faucet, lavatory faucet or shower/tub control. There is a rotatable and reciprocal stem within the sleeve. The handle for the mixing valve includes a cap attached to the stem and a lever connected to the sleeve. There is an opening in the cap, with the lever extending through the cap opening and into engagement with the sleeve. A removable locating key is positioned within the cap and interlocked with both the lever and the cap.

3 Claims, 3 Drawing Figures

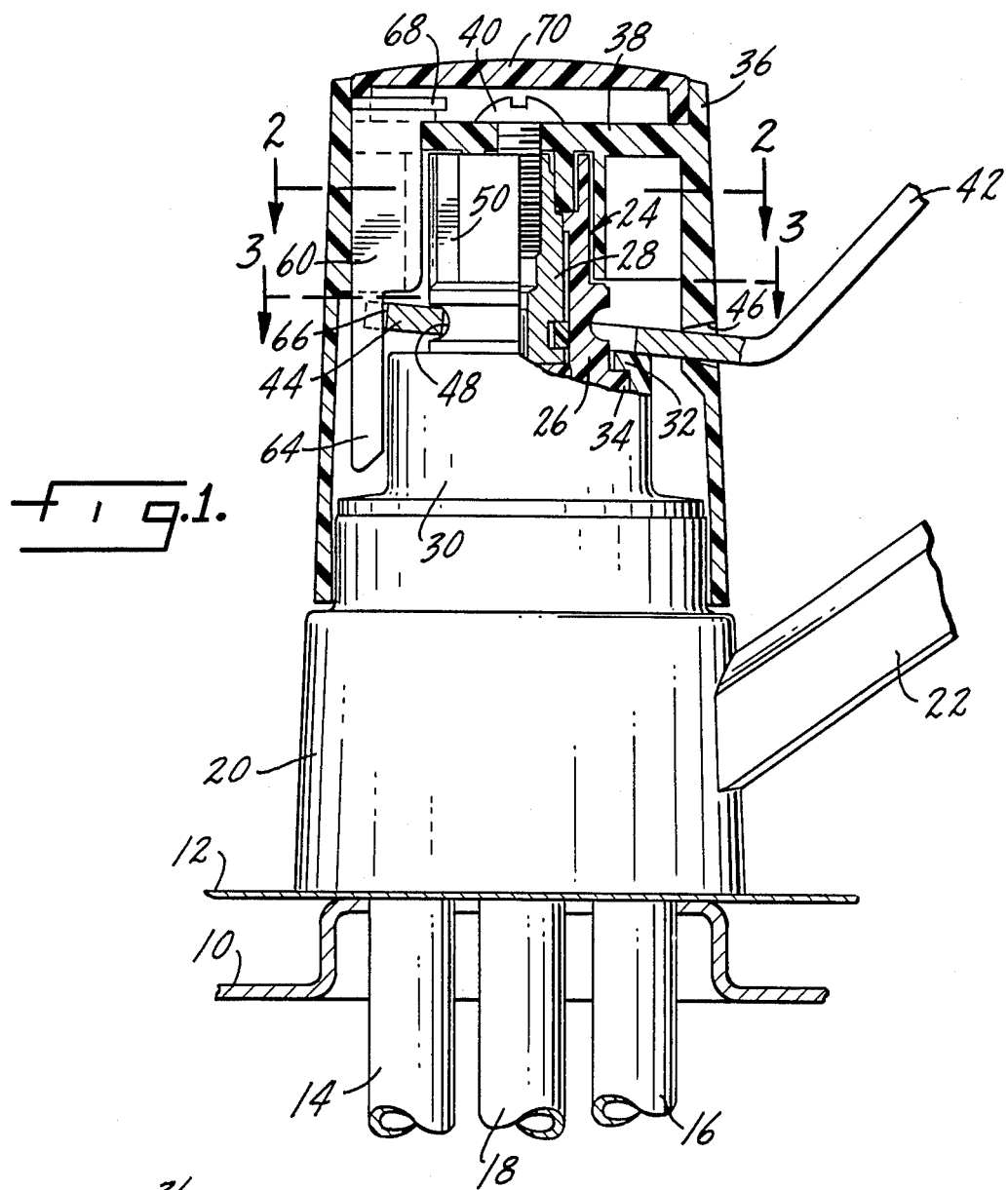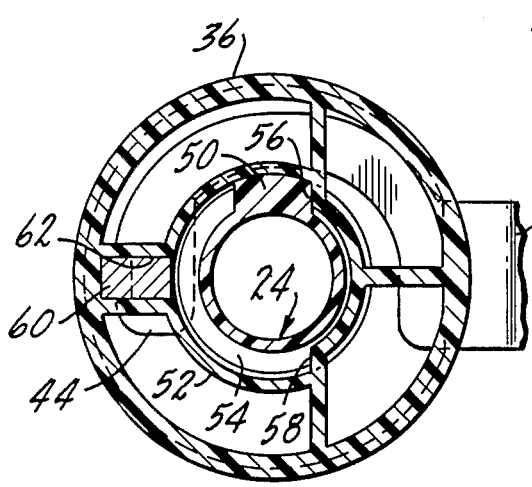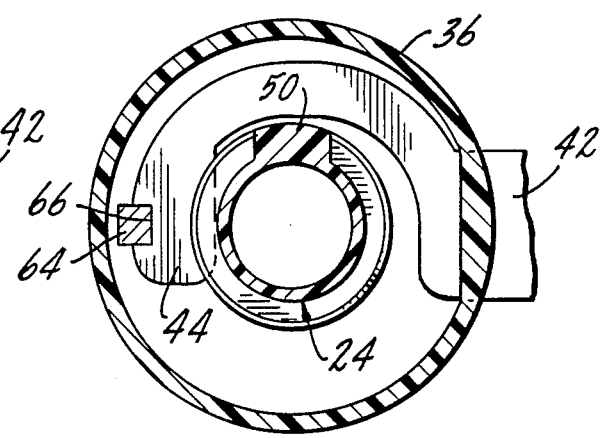

HANDLE CONSTRUCTION FOR MIXING VALVE

SUMMARY OF THE INVENTION

The present invention relates to hot and cold water mixing valves and, in particular, to an improved handle structure for such a valve.

A primary purpose of the invention is a combination cap and lever for a mixing valve using a locating key to insure that the handle structure is correctly oriented relative to the mixing valve.

Another purpose is a simply constructed reliable cap and lever structure for a mixing valve which includes a locating key to insure proper alignment of the parts thereof.

Other purposes will appear in the ensuing specification, drawings and claims.

BRIEF DESCRIPTION OF THE DRAWINGS

The invention is illustrated in the following drawings wherein:

FIG. 1 is an axial section through a mixing valve and its associated cap and lever, FIG. 2 is a section along plane 2—2 of FIG. 1, and FIG. 3 is a section along plane 3—3 of FIG. 1.

DESCRIPTION OF THE PREFERRED EMBODIMENT

The present invention is concerned with single lever mixing valves of the type wherein a rotatable and reciprocal stem controls both volume and temperature of the water discharge. Valves of the type described which are manufactured by the Moen Group of Stanadyne, Inc., have all of the operating parts of the valve within a unitary cartridge which is inserted in a valve fixture such as a kitchen faucet, lavatory faucet or shower/tub control. Such a valve cartridge may be replaced at periodic intervals, which has the effect of providing an essentially new faucet. The Moen Group of Stanadyne currently manufactures two types of valve cartridge. One such cartridge is illustrated in U.S. Pat. Re. 25,920 and the other type of cartridge is illustrated in U.S. Pat. Nos. 3,726,317, 3,730,222, 3,840,048 and 3,916,950, among others. Valves of the type shown in the latter group of patents are known commercially as the MOEN 1225 and valves of the type shown in the reissue patent are known commercially as the MOEN 1200.

The present invention is specifically concerned with a handle construction usable with such mixing valve cartridges, although the structure shown and described herein is applicable with any type of mixing valve employing movement about two different axes.

In the embodiment disclosed herein, the handle construction is that of a kitchen faucet, however, in concept the structure may be applied to other faucet applications. A sink top support is indicated at 10 and the conventional escutcheon positioned thereon is indicated at 12. A hot water pipe is indicated at 14 and a cold water pipe is indicated at 16 and a hose spray pipe 18 is positioned between the inlet pipes. All three pipes extend through the escutcheon and into a valve housing which supports a decorative outer shell 20 which may be integral with a conventional spout 22.

Positioned within the housing or the valve fixture is a valve cartridge 24 including an outer sleeve 26 and an axially and rotatably movable valve stem 28. The valve cartridge may be of the type manufactured by the Moen Group of Stanadyne as described in the above patents.

Valve cartridge 24 is held within the housing by means of a nut 30 which is threaded onto the exterior of the housing and in its fully assembled position rests upon a ledge of the housing. The upper end of nut 30 has an inwardly directed flange 32 which extends over an outwardly directed flange 34 on sleeve 26.

The operating mechanism for the valve includes a cap 36 which extends over the assembly described and has a lower surface which terminates adjacent an upper surface of shell 20 with the combination of the cap and the shell forming the decorative outer cover for the housing. Adjacent the top of cap 36 there is a partition 38 which is attached by means of a screw 40 to the upper end of the valve cartridge stem.

A lever 42 has a hook 44 which extends inside of cap 36 through an opening in the cap indicated at 46. A similar lever is shown in U.S. Pat. No. 3,726,316. The hook extends partially, but not completely, about sleeve 26 and is positioned within a groove 48 in the sleeve. Thus, lever 42 is attached to the sleeve and passes through an opening in the cap whereby up and down movement of the lever will cause in and out axial movement of the valve cartridge stem which is attached to cap 36. Similarly, rotary motion of handle 42 will cause rotary movement of the stem, thus providing the rotary and axial movements required to control the volume and temperature of water discharged through the valve cartridge.

There is an exterior projection 50 on the sleeve which functions as a stop limiting rotary movement of the cap and lever. Cap 36 has an interior annular wall 52 which defines a chamber 54. End surfaces 56 and 58 adjoin wall 52 and with projection 50 define the limits of cap movement. Thus, as is conventional in single lever mixing faucets, the lever and cap are rotated between stops, one limiting movement in the cold water direction, and the other limiting movement in the hot water direction.

In order that the cap be properly positioned relative to the valve cartridge so that the stops are in the correct location for limiting handle rotation, there is a lever installation key 60 which is positioned within cap 36 in a space 62. Key 60 has an elongated portion 64 which extends within a groove or recess 66 in that portion of the hook 44 of handle 42 which is directly opposite the handle. Groove 66 is in alignment with space 62 as shown in FIGS. 2 and 3. Thus, key 60 locks cap 36 to the lever and also insures that the positioning of the cap and lever are correct relative to the valve cartridge so that the user knows from the position of the handle on the sink whether it is in a hot water position, a cold water position or a mixed water position. Installation key 60 has an upper shoulder 68 which provides a means for quickly removing the key from its position within the cap once exterior bezel 70 has been removed from the end of the cap.

When the handle and cap are installed on the housing and valve cartridge, the handle fits through opening 46 in the cap and the handle and cap as a unit slide over the end of the stem with the hook portion being positioned within groove 48 on the valve cartridge sleeve. Once the elements are so positioned, installation key 60 passes through the aligned openings in the cap and handle, locking these elements to the sleeve and insuring that they are properly positioned relative to each other. Bezel 70 may then be inserted to complete installation.

Whereas the preferred form of the invention has been shown and described herein, it should be realized that there may be many modifications, substitutions and alterations thereto.

The embodiments of the invention in which an exclusive property or privilege is claimed are defined as follows:

1. A hot and cold water mixing valve including a sleeve formed and adapted to fit within a valve fixture such as a kitchen faucet, lavatory faucet or shower/tub control, and a rotatable and reciprocal stem within the sleeve, handle means for said mixing valve including a cap attached to said stem and a lever connected to said sleeve, an opening in said cap, with said lever extending through said opening, a partition in said cap adjacent the exterior end therof, an opening in said partition, an opening in said lever in alignment with said partition opening, a removable locating key within said cap and positioned in the aligned partition and lever opening to thereby interlock said cap and lever, said locating key having finger gripping means thereon extending in spaced relation to said partition for ease in removal of said locating key and thereby facilitating the assembly and disassembly of said cap and lever.

2. The mixing valve of claim 1 further caracterized in that said sleeve has a peripheral groove, an interior surface of said lever being positioned, in part, within said groove, with the interlocking locating key opening in said lever being on an exterior surface thereof.

3. The mixing valve of claim 1 further characterized in that said sleeve has a rotary stop element extending outwardly therefrom, said cap including a circular chamber having end surfaces therein, said stop element being positioned in said chamber, with said cap rotating about said sleeve between the positions defined by contact between said sleeve stop and the end surfaces of said chamber.

* * * * *